US012758903B2

(12) United States Patent
Mckenzie et al.

(10) Patent No.: US 12,758,903 B2
(45) Date of Patent: Oct. 13, 2026

(54) FILTER CARTRIDGE, AND METHOD OF RETROFITTING FILTER HOUSING

(71) Applicant: ENTEGRIS, INC., Billerica, MA (US)

(72) Inventors: Jeffrey J. Mckenzie, Watertown, MN (US); Barry L. Gregerson, Deephaven, MN (US); James C. Linder, Victoria, MN (US); Hayden Lincicome, Waltham, MA (US)

(73) Assignee: ENTEGRIS, INC., Billerica, MA (US)

( * ) Notice: Subject to any disclaimer, the term of this patent is extended or adjusted under 35 U.S.C. 154(b) by 577 days.

(21) Appl. No.: 17/981,229

(22) Filed: Nov. 4, 2022

(65) Prior Publication Data

US 2023/0149838 A1 May 18, 2023

Related U.S. Application Data

(60) Provisional application No. 63/279,298, filed on Nov. 15, 2021.

(51) Int. Cl.
*B01D 35/157* (2006.01)
*B01D 35/30* (2006.01)

(52) U.S. Cl.
CPC ......... *B01D 35/1573* (2013.01); *B01D 35/30* (2013.01)

(58) Field of Classification Search
CPC ................ B01D 35/1573; B01D 35/30; B01D 2201/302; B01D 29/15; B01D 35/147; B01D 35/153; B01D 35/16; B01D 29/31; B01D 2201/291; B01D 2201/34; B01D 2201/40
USPC .................................................. 210/136, 117
See application file for complete search history.

(56) References Cited

U.S. PATENT DOCUMENTS

| | | | | |
|---|---|---|---|---|
| 3,982,520 | A | 9/1976 | Wheeler | |
| 4,690,621 | A * | 9/1987 | Swain | B01D 29/822 417/313 |
| 5,362,390 | A | 11/1994 | Widenhoefer et al. | |
| 5,520,801 | A | 5/1996 | Gerber | |
| 5,744,030 | A | 4/1998 | Reid et al. | |
| 6,027,644 | A | 2/2000 | Magnusson | |
| 8,268,170 | B2 | 9/2012 | Core et al. | |
| 8,534,283 | B2 | 9/2013 | Howe, Jr. et al. | |
| 10,646,803 | B2 | 5/2020 | Greco et al. | |
| 2005/0067342 | A1 | 3/2005 | Bassett et al. | |

(Continued)

FOREIGN PATENT DOCUMENTS

| | | | |
|---|---|---|---|
| CN | 108883347 | A | 11/2018 |
| CN | 108883353 | A | 11/2018 |

(Continued)

*Primary Examiner* — Madeline Gonzalez

(57) ABSTRACT

A removable filter cartridge includes a filter housing containing a filter for filtering liquid and a sealing valve assembly coupled to the filter housing and for removably coupling the filter cartridge to a filter head. The sealing valve assembly include an inlet passageway and an outlet passageway. The sealing valve also including an inlet sealing valve that blocks the inlet passageway and an outlet sealing valve that blocks the outlet passageway while the filter cartridge is uncoupled from the filter head. A method of retrofitting a filter housing includes removing the filter housing from a filter head, coupling a sealing valve assembly to the removable filter to form a removable filter cartridge, and coupling the removable filter cartridge to the filter head.

10 Claims, 10 Drawing Sheets

(56) References Cited

U.S. PATENT DOCUMENTS

| | | | | |
|---|---|---|---|---|
| 2008/0190832 | A1 | 8/2008 | Schachtrup | |
| 2011/0089092 | A1 * | 4/2011 | Williams ............. | B01D 35/147<br>210/120 |
| 2014/0124433 | A1 | 5/2014 | Seo | |

FOREIGN PATENT DOCUMENTS

| | | | |
|---|---|---|---|
| CN | 109650466 | A | 4/2019 |
| CN | 111544950 | A | 8/2020 |
| CN | 218971856 | U | 5/2023 |
| DE | 3828907 | A1 | 3/1990 |
| EP | 3219372 | A2 | 9/2017 |
| GB | 2121500 | A | 12/1983 |
| JP | H0262485 | A | 3/1990 |
| JP | H0261410 | U | 5/1990 |
| JP | H09209960 | A | 8/1997 |
| JP | 2018084180 | A | 5/2018 |
| KR | 940023006 | U | 10/1994 |
| KR | 20110137066 | A | 12/2011 |
| KR | 20130130941 | A | 12/2013 |
| WO | 2015066486 | A1 | 5/2015 |
| WO | 2020236204 | A1 | 11/2020 |

* cited by examiner 1
28
22
24
10
20
40
34A
36
34B
30
46
26
72A
82A
78A
fCP
92A
74A
76A
80A
70A
86A
86A
62A
60
56
58
42
62B
48
82B
70B
fCP
92B
D1
D2
f
2
4
90

FILTER CARTRIDGE, AND METHOD OF RETROFITTING FILTER HOUSING

CROSS-REFERENCE TO RELATED APPLICATIONS

This application claims the benefit under 35 USC 119 of U.S. Provisional Patent Application No. 63/279,298, filed Nov. 15, 2021, the disclosure of which is hereby incorporated herein by reference in its entirety.

FIELD

This disclosure generally relates to a filter assembly. More particularly, this disclosure relates to a removable filter cartridge in a filter assembly.

BACKGROUND

Filters can be employed in semiconductor manufacturing to remove contaminants from a fluid. A filter head can direct a fluid (e.g., liquid, water, or the like) through a removable filter. The filter can be configured to remove containment such as, for example, solids as the liquid passes through the filter. In particular, a filter can be used to remove solid containments from a liquid as the liquid passes through the filter. A filter becomes saturated with trapped containments (e.g., solids) over time and is then replaced. Conventionally, the housing of the filter is drained and then removed and replaced with a new filter.

SUMMARY

In an embodiment, a removable filter cartridge includes a filter housing and a sealing valve assembly. The filter housing has an internal volume containing a filter configured to filter liquid passing through the internal volume, the filter housing including an open end with an inlet and an outlet. The sealing valve assembly including a first end configured to be removably coupled to a filter head, a second end coupled to the open end of the filter housing, an inlet passageway configured to direct liquid into the inlet of the filter housing, and an outlet passageway configured to direct the liquid discharged from the outlet of the filter housing after being filtered by the filter. The sealing valve assembly also includes an inlet sealing valve configured to block the inlet passageway and an outlet sealing valve configured to block the outlet passageway when the sealing valve assembly is uncoupled from the filter head such that the internal volume is sealed while the removable filter cartridge is uncoupled from the filter head.

In an embodiment, a sealing valve assembly for a removable filter cartridge includes a first end, a second end, and an inlet passageway and an outlet passageway that each extend through the sealing valve assembly. The first end is configured to removably couple to a filter head. The second end is configured to couple the sealing valve assembly to a filter housing to form the removable filter cartridge such that the inlet passageway directs liquid into an inlet of the filter housing and the outlet passageway directs the liquid discharged from an outlet of the filter housing after passing through the filter housing. The sealing valve assembly also including an inlet sealing valve configured to block the inlet passageway and an outlet sealing valve configured to block the outlet passageway when the sealing valve assembly is uncoupled from the filter head such that the internal volume is sealed while the removable filter cartridge is uncoupled from the filter head.

In an embodiment, a method of retrofitting a filter housing includes removing the filter housing from a filter head, coupling a sealing valve assembly to the filer housing to form a removable filter cartridge, and coupling the filter cartridge to the filter head. Removing the filter housing from the filter head includes uncoupling the filter housing from the filter head. Coupling the sealing valve assembly to the filter housing includes coupling a first end of the sealing valve assembly to an open end of the filter housing. Coupling the removable filter cartridge to the filter head includes coupling a second end of the sealing valve assembly to the filter head.

DRAWINGS

Like numbers represent like features.

DETAILED DESCRIPTION

Figure 1:
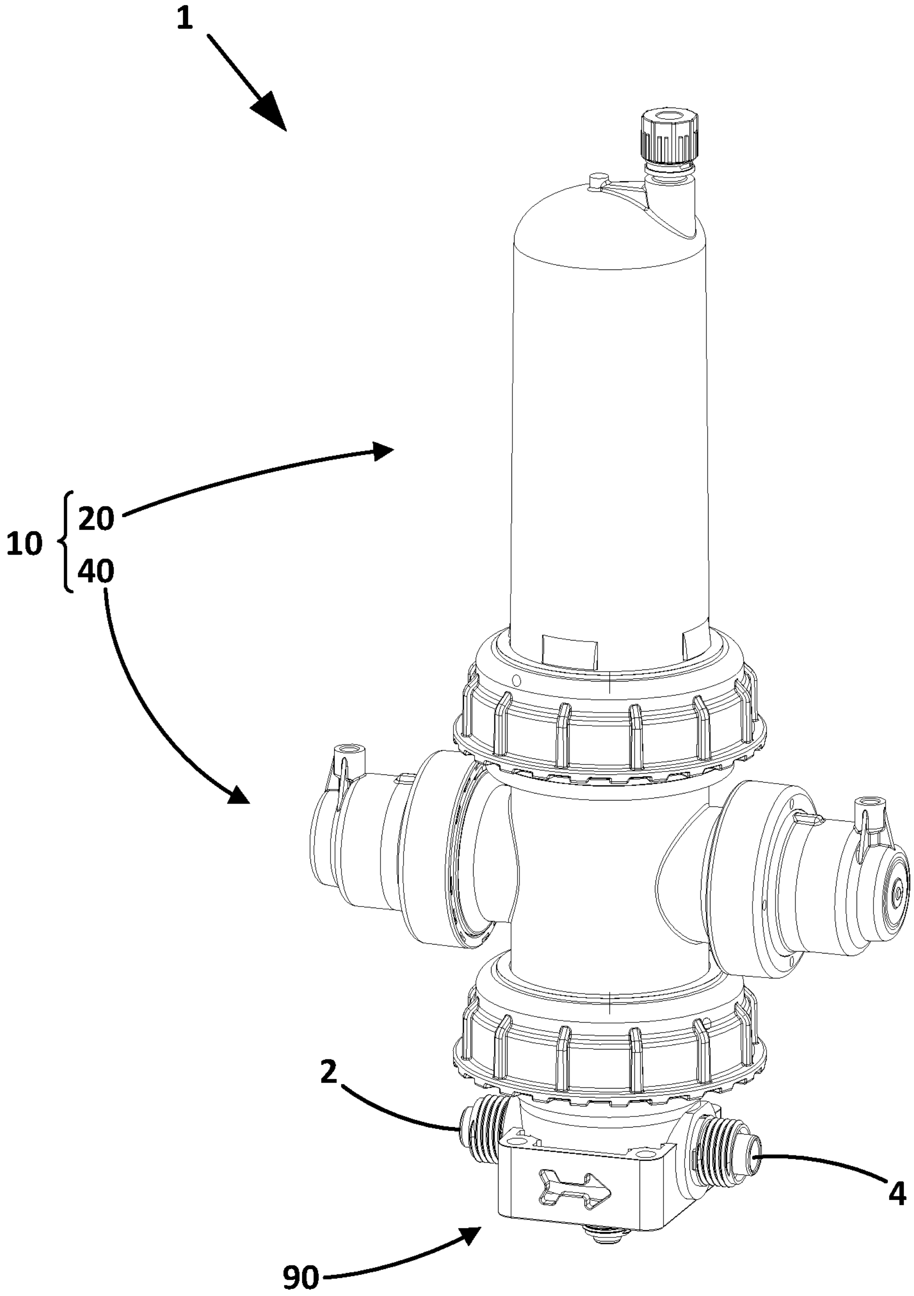
FIG. 1 is front perspective view of an embodiment of a filter assembly.
Figure 2:
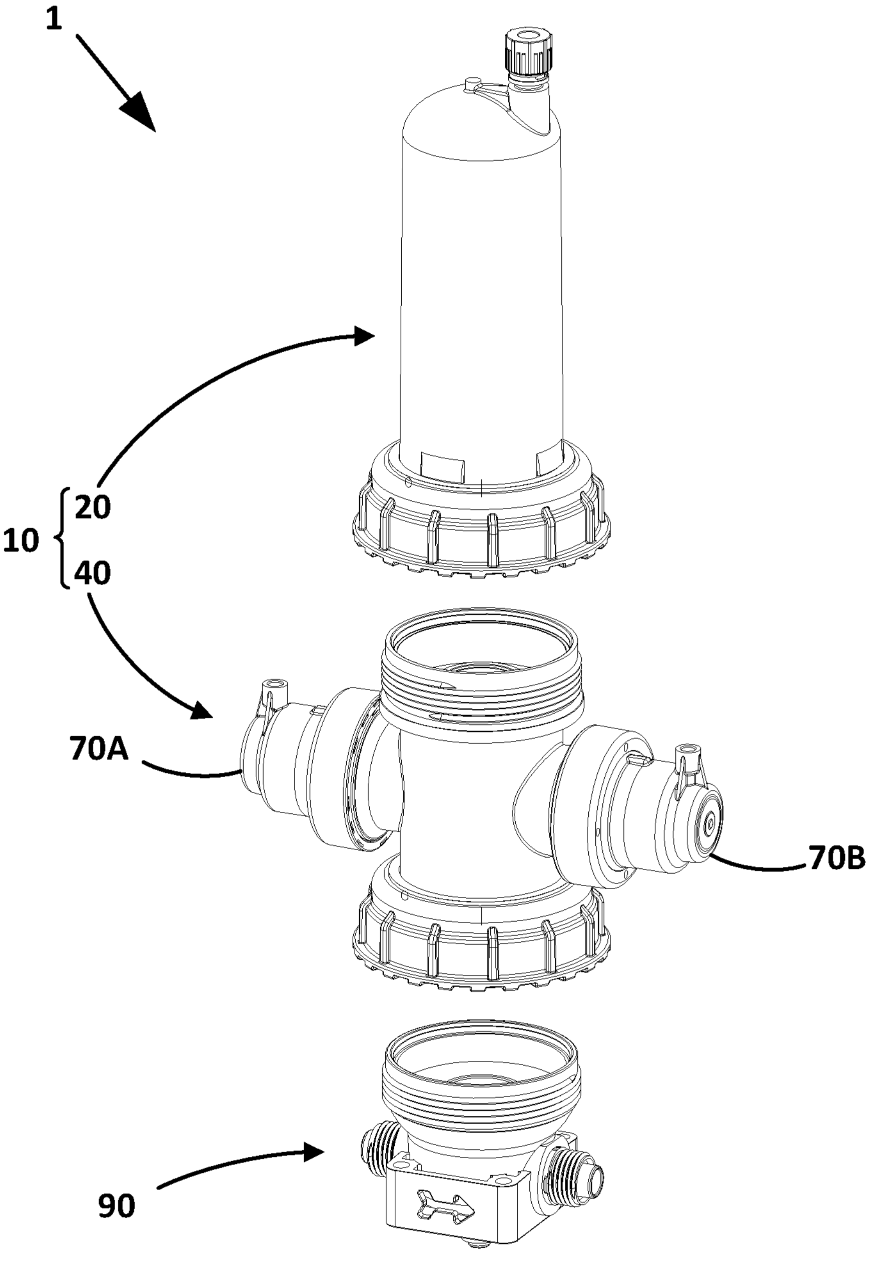
FIG. 2 is an exploded view of the removable filter cartridge in FIG. 1, according to an embodiment.

FIGS. 1 and 2 show an embodiment of a filter assembly 1. FIG. 1 is a front perspective view of the filter assembly 1. The filter assembly 1 includes a fluid inlet 2 and a fluid outlet 4. A fluid to be filtered is supplied to the fluid inlet 2, is filtered by the filter assembly 1, and then the filtered fluid is directed out from the fluid outlet 4 of the filter assembly 1. The filter assembly 1 removes solids from the fluid as the fluid passes through. In an embodiment, the fluid is liquid or mostly liquid. For example, the liquid may be water (e.g., deionized water), HCl, $HNO_3$, isopropyl alcohol, or the like. In an embodiment, the fluid is water. The filter assembly 1 includes a removable filter cartridge 10 that is coupled to a filter head 90. The removed solids remain within the filter cartridge 10. The filter head 90 includes the fluid inlet 2 and the fluid outlet 4 of the filter assembly 1.

The removable filter cartridge 10 is configured to be removed from the filter head 90. For example, the removable filter cartridge 10 is removed when due for replacement. The removable filter cartridge 10 may be due for replacement after performing a predetermined amount of filtering. For example, after the removable filter cartridge 10 has filtered predetermined amount of fluid, has filtered a predetermined amount of material from the fluid, has been in use for a predetermined amount of time, has reached a particular saturation of filtered material, etc.

The removable filter cartridge 10 includes a filter housing 20 and a sealing valve assembly 40. The sealing valve assembly 40 is coupled to the filter housing 20 to form the removable filter cartridge 10. The sealing valve assembly 40 removably couples the removable filter cartridge 10 to the filter head 90. As shown in FIG. 1, the filter housing 20 is removably coupled to the filter head 90 by the sealing valve assembly 40.

FIG. 2 is an exploded view of the removable filter cartridge 10. FIG. 2 shows the filter housing 20, sealing valve assembly 40, and filter head 90 when uncoupled from each other. In the illustrated embodiment, the sealing valve assembly 40 is uncoupled from the filter head 90 by being unscrewed from the filter head 90, and the filter housing 20 is uncoupled from the sealing valve assembly 40 by being unscrewed from the filter head 90. The sealing valve assembly 40 includes sealing valves for sealing the filter housing 20. The sealing valves include an inlet sealing valve 70A configured to block flow of liquid into the filter housing 20 (e.g., from the filter head 90) and an outlet sealing valve 70B configured to block flow of liquid out of the filter housing 20 (e.g., to the filter head 90). The inlet sealing valve 70A and the outlet sealing valve 70B when closed are configured to seal the filter housing 20.

Figure 3:
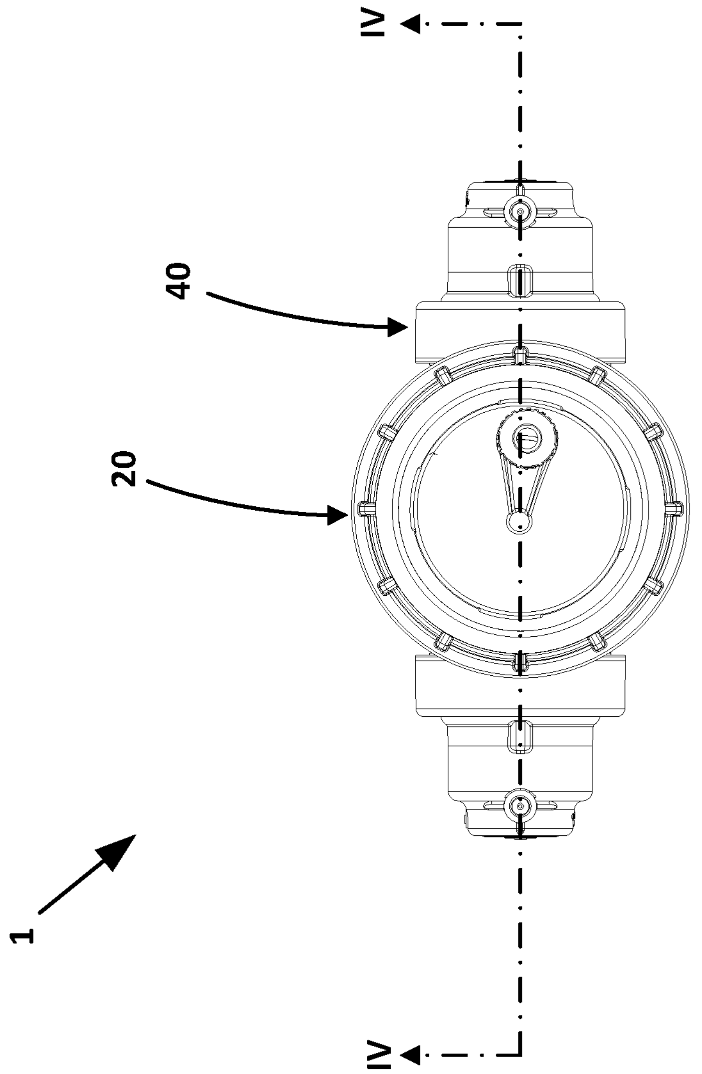
FIG. 3 is a top view of the filter assembly in FIG. 1, according to an embodiment.
Figure 4:
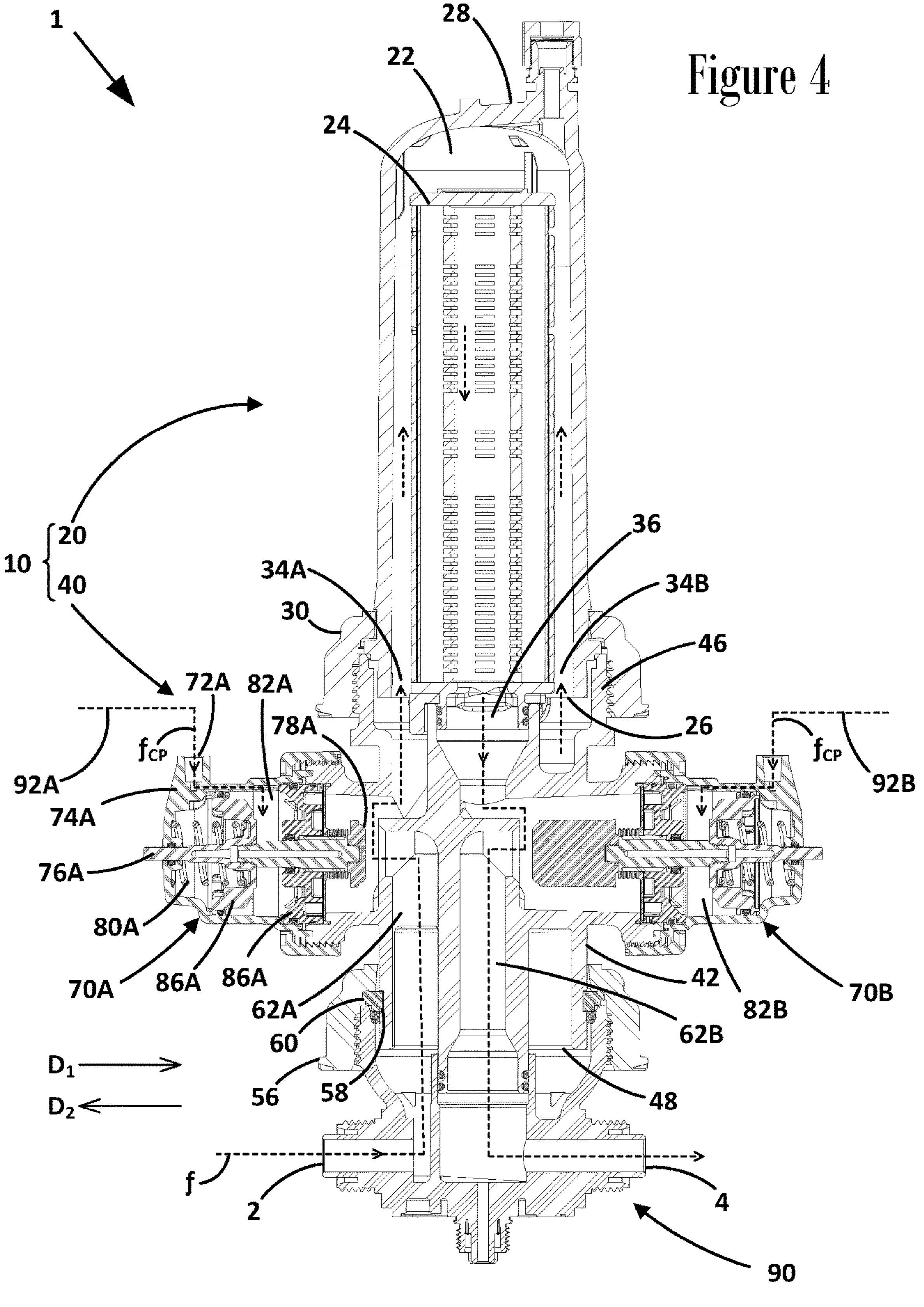
FIG. 4 is a vertical cross-sectional view of filter assembly along the line IV-IV in FIG. 3 with a valve sealing assembly of the filter assembly in the open position, according to an embodiment.

FIG. 3 is a top view of the filter assembly 1. The sealing valve assembly 40 has an open position and a closed positon. For example, the sealing valve assembly 40 is configured to be moved between its open positon and closed person. FIG. 4 is a vertical cross-sectional view of the filter assembly 1 with the sealing valve assembly 40 in the open position. For example, the vertical cross-sectional view in FIG. 4 is indicated by line IV-IV in FIG. 3. In the open position, the sealing valve assembly 40 is configured to allow fluid f to flow through the sealing valve assembly 40. In the closed positon (e.g., shown in FIG. 5), the sealing valve assembly 40 is configured to block flow through the sealing valve assembly 40.

As shown in FIG. 4, the filter housing 20 includes an internal volume 22 that contains a filter 24. Dashed lines are provided in FIG. 4 to illustrate the flow of the fluid f through the filter assembly 1. In the open position, fluid f from the filter head 90 is allowed to pass through the sealing valve 40 to the filter housing 20, pass through the filter housing 20, and then pass from the filter housing 40 through the sealing valve 40 back to the filter head 90. The open position of the sealing valve 40 is configured to allow the fluid to flow into and out of the internal volume 22 of the filter housing 20. The filter 24 filters fluid f as it passes through the removable filter cartridge 10. The fluid f is filtered as it passes through the filter housing 40, such that the fluid f flowing back to the filter head 20 (and then out through the fluid outlet 4) is filtered fluid.

The sealing valve assembly 40 has a first end 46 and a second end 48 opposite to the first end 46. The first end 46 of the sealing valve assembly 40 is coupled to the filter housing 20. The second end 48 of the sealing valve assembly 40 is configured to removably coupled to the filter head 90.

As shown in the illustrated embodiment, the filter housing 20 may have a bowl shape. The filter housing 20 has an open end 26 and a closed end 28. The open end 26 and the closed end 28 of the filter housing 20 are opposite ends of the length L of the filter housing 20. The open end 26 may also be referred to as a fluid inlet-outlet as the fluid f enters and exits the filter housing 20 through its open end 26. As shown in FIG. 4, a first end 46 of the sealing valve 40 is configured to be coupled to the filter housing 20. The first end 46 of the sealing valve 46 is coupled to the open end 26 of the filter housing 20.

In the illustrated embodiment, the first end 46 of the sealing valve 40 is coupled to the filter housing 20 by threads on the sealing valve 40 and the filter housing 20. For example, the filter housing 20 is configured to be screwed onto the sealing valve 40 by screwing a coupling nut 30 of the filter housing 20 onto the sealing valve 40. In an embodiment, the threads of the sealing valve 40 (e.g., threads of the coupling nut 56 of the sealing valve 40) and the threads of the filter housing 20 (e.g., threads of the coupling nut 30) have the same structure (e.g., thread size, thread spacing, etc.). It should be appreciated that sealing valve 40 in other embodiments may be coupled to the filter housing 20 in a different manner than being screwed together via threads. In another embodiment, the sealing valve 40 and the filter housing 20 may be coupled by, for example but not limited to, clamping (e.g., with a tri-coupler, etc.) or bonding (e.g., thermal bonding of the sealing valve 40 to the filter housing 20, etc.).

The sealing valve 40 is configured to be removably coupled to the filter head 90. The second end 48 of the sealing valve 40 is removably coupled to the filter head 90. In the illustrated embodiment, the sealing valve 40 includes threads that screw into threads on the filter head 90 to removably couple the removable filter cartridge 10 to the filter head 90. As shown in FIG. 4, the sealing valve 40 can include a coupling nut 56 with threads that screw onto to the threads of the filter head 90. It should be appreciated that the sealing valve 40 in other embodiments may be configured to removably couple to the filter head 90 in a different manner than via threads. In an embodiment, the sealing valve 40 may be configured to removably couple to the filter head 90 by, for example but not limited to, via clamping (e.g., with a tri-coupler, or the like).

As shown in FIG. 4, the sealing valve 40 can include a circumferential groove 58 and a snap ring 60 disposed in the circumferential groove 58 of the valve body 42. The circumferential groove 58 extends around a circumference of the sealing valve 40. The snap ring 60 is configured to be compressed between the sealing valve 40 and the filter head 90 when the sealing valve 40 is removably coupled to the filter head 90. In the illustrated embodiment, the snap ring 60 is compressed between the coupling nut 56 of the sealing valve 40 and the filter head 90 when the coupling nut 56 is screwed onto the filter head 90.

The filter housing 20 includes a first inlet 34A, a second inlet 34B, and an outlet 36 provided at the open end 26 of the filter housing 20. For example, the first inlet 34A, the second inlet 34B, and the outlet 36 are different passages extending into the filter housing 20 from the open end 26 (e.g., the open end 26 of the filter housing 20 including the inlets 34A and outlet 36). In the illustrated embodiment, the outlet 36 is disposed radially between the first inlet 34A and the second inlet 34B. The filter housing 20 is configured such that the fluid f enters the filter housing 20 through the inlets 34A, 34B and exits the filter housing 20 (e.g., after passing through and being filtered by the filter 24) through the outlet 36. It should be appreciated that the filter housing 20 in an embodiment may have a different number of inlets and/or outlets than three. In some embodiments, the filter housing 20 may include one or more inlets 34A, 34B and one or more outlets 36. In an embodiment, the filter housing 20 may include one inlet 34A and one outlet 34A. In another embodiment, the filter housing 20 may include two or more inlets 34A, 34B and/or two or more outlets 36.

The sealing valve assembly 40 includes passageways 62A, 62B that fluidly connect the filter housing 20 and the filter head 90 when the sealing valve assembly 40 is open. As shown in FIG. 4, the sealing valve assembly 40 has a valve body 42 that includes the passageways 62A, 62B. For example, the valve body 42 includes the first end 46 and the second end 48 of the sealing valve assembly 40. The passageways 62A, 62B extending through the valve body 42. The fluid f flows through the sealing valve assembly 40 by flowing through the passageways 62A, 62B. The sealing valve assembly 40 includes an inlet passageway 62A that directs fluid f from the filter head 90 into the filter housing 40 and an outlet passageway 62B that directs the fluid f (after being filtered in the filter housing 20) from the filter housing 20 back to the filter head 90.

The valve body 42 includes the passageways 62 for the inlets and outlet(s) 34A, 34B, 36 in the open end 26 of the filter housing 20. Each of the passageways 62 extends through the valve body 42. Each of the passages 62 extends through the valve body 42 from the first end 46 to the second end 48. As shown in FIG. 4, the passages 62 in the valve body 42 include the inlet passage 62A and the outlet passageway 62B that each separately extend through the valve body 42. In the open position, the inlet passageway 62A directs the fluid f from the filter head 90 (e.g., fluid to be filtered) to the inlets 34A, 36B of the filter housing 20 and the outlet passageway 62B directs the fluid f (e.g., the filtered fluid) from the outlet 36 of the filter housing 20 to the filter head 90. The inlet passage 62A connects the fluid inlet 2 of the filter head 90 (e.g., the passage in the filter head 90 extending from the fluid inlet 2) to the inlet(s) 34A, 34B of the filter housing 20. The outlet passage 62B connects the outlet 36 of the filter housing 20 (e.g., the passage in the filter head 90 extending from the fluid outlet 4) to the fluid outlet 4 of the filter head 90.

As shown by the dashed lines in FIG. 4, the inlet passageway 62A fluidly connects the fluid inlet 2 of the filter head 90 to the first and second inlets 34A, 34B of the filter housing 20, and the outlet passageway 62B fluidly connects the outlet 36 of the filter housing 20 to the fluid outlet 4 of the filter head 90. For example, the inlet passageway 62A directs the fluid f supplied from the passage of the fluid inlet 2 of the filter head 90 to the inlets 34A, 34B of the filter housing 20. For example, the outlet passageway 62B directs the filtered fluid f from the outlet 36 to the passage in the filter head 90 for the fluid outlet 4.

The sealing valve assembly 40 is configured to be actuated between the open position and the closed position by actuating the sealing valves 70A, 70B. The sealing valves 70A, 70B are gas actuated valves configured to be actuated between their open and closed positions using compressed gas $f_{CP}$. For example, the compressed gas $f_{CP}$ is a generally inert gas (e.g., nitrogen, air, filtered air, etc.) that has a pressure greater then ambient pressure. In an embodiment, the pressure of the compressed gas $f_{CP}$ may be greater than 20 psig. In an embodiment, the pressure of the compressed gas $f_{CP}$ may be greater than 40 psig. In an embodiment, the pressure of the compressed gas may be from 20 psig-90 psig.

In the illustrated embodiment, each of the sealing valves 70A, 70B is a gas open valve configured to be closed when not supplied with compressed gas $f_{CP}$. For example, connecting the removable filter cartridge 10 to the filter head 90 includes removably coupling the removable filter cartridge 10 to the filter head 90 and connecting compressed gas lines 92A, 92B to the sealing valves 70A, 70B. A first compressed gas line 92A is connected to an external gas inlet 72A of the inlet sealing valve 70A, and a second compressed gas line is connected to an external gas inlet 72B of the outlet sealing valve 70B. The first compressed gas line 92A supplies compressed gas $f_{CP}$ to the inlet sealing valve 70A and the second compressed line 92B supplies compressed gas $f_{CP}$ to the outlet sealing valve 70B.

Figure 5:
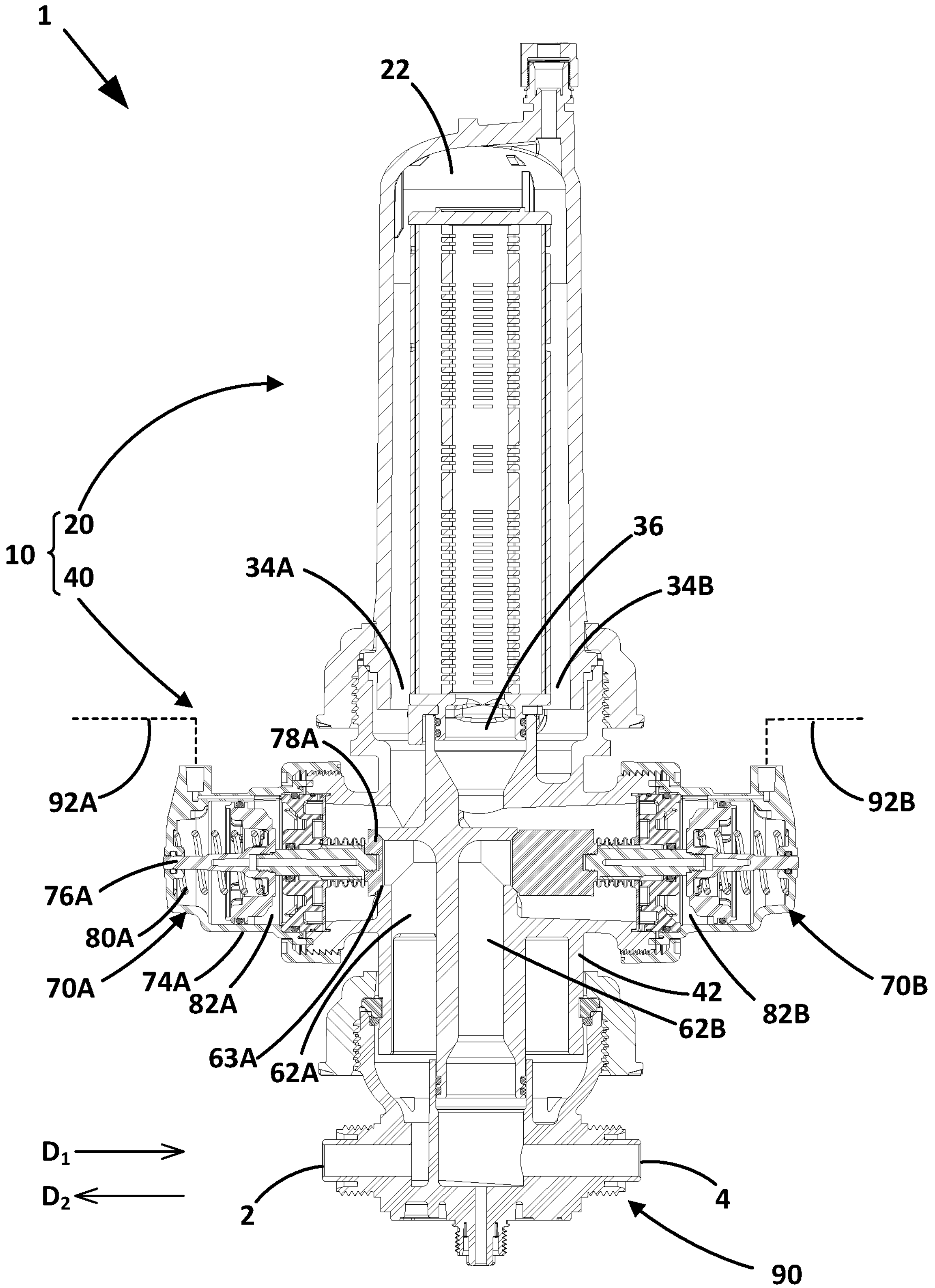
FIG. 5 is a vertical cross-sectional view of the filter assembly along the line IV-IV in FIG. 3 with the valve sealing assembly in the closed position, according to an embodiment.

The inlet sealing valve 70A includes the external gas inlet 72A, a valve housing 74A, a valve stem 76A, a valve head 78A, a spring 80A, and an internal space 82A. The external gas inlet 72A is disposed in the valve housing 74A and fluidly connects to the internal space 82A of the inlet sealing valve 70A. Compressed gas $f_{CP}$ is supplied to the external gas inlet 72A to actuate the inlet sealing valve 70 from its closed position (e.g., as shown in FIG. 5) to its open position (e.g., as shown in FIG. 4). The compressed gas $f_{CP}$ compresses the spring 80A causing the valve head 78A to move into its open position. In the open position, the valve head 78A allows for the fluid f to pass through the inlet passageway 62A (e.g., does not block the inlet passageway 62A).

For example, the valve head 78A is disposed on the valve stem 76A and outside of the valve housing 74A. The valve stem 76A extends through a sidewall 84A of the valve housing 74A into the inlet passageway 62A. The spring 80A is configured to bias the valve head 78A into a closed position (e.g., shown in FIG. 5) that blocks the inlet passageway 62A. For example, the valve head 78A is on the end of the valve stem 76A, and the spring 80A biases the valve stem 76A (e.g., in a first direction $D_1$) into the inlet passageway 62A which positions the valve head 78A into its closed position that blocks an opening 63A (e.g., a valve seat) in the inlet passageway 62A (e.g., as show in FIG. 5).

In the illustrated embodiment, the compressed gas $f_{CP}$ is supplied to the internal space 82A through the external gas inlet 72A. The internal space 82A is filled with the compressed gas $f_{CP}$ (e.g., internal space 82A is pressurized from a first pressure $P_1$ to a second pressure $P_2$) The compressed gas in the internal space 82A compresses the spring 80A which retracts the valve head 78A from the inlet passageway 62A actuating the inlet sealing valve 70A from its closed position to its open position (shown in FIG. 4). For example, as shown in FIG. 4, the spring 80A is affixed to the valve plate 86A and is configured to bias the valve head 78A in a first direction $D_1$. The compressed gas in the internal space 82A pushes the valve plate 86A in the opposite direction (e.g., second direction $D_2$) which compresses the spring 80A and overcomes the biasing force of the spring 80A on the valve head 78A. This moves the valve head 78A away from the opening 63A in the inlet passageway 62A (e.g., moves the valve head 78A in direction $D_2$ towards the sidewall 84A of the inlet sealing valve 70A) such that the valve head 78A no longer blocks the opening 63A/inlet passageway 62A.

For simplicity, the configuration of the inlet sealing valve 70A is discussed above. It should be appreciated that the outlet sealing valve 70B can have a similar configuration as described for the inlet sealing valve 70A except with respect to blocking the outlet passageway 62B.

It should be appreciated that the filter housing 20 in other embodiments may have a different number of inlets and outlets 34A, 34B, 36 at its open end 26 than three (e.g., one inlet, more than two inlets, multiple outlets etc.). In an embodiment, the sealing valve assembly 40 (e.g., the valve body 42) may have a different number of inlet and outlet passageways 62A, 62B than two (e.g., same number of corresponding passages as inlets and outlets in the filter housing 20, etc.). For example, the valve body 42 in an embodiment may include a second inlet passageway 62A for separately directing a portion of the fluid f to be filtered to the second inlet 34B of the filter housing 20, and the sealing valve assembly 40 including a second inlet sealing valve 70A for the second inlet passageway 62A.

FIG. 5 is a vertical cross-sectional view of the filter assembly 1 with the sealing valve assembly 40 in the closed position. For example, the vertical cross-section of FIG. 5 is along the line VI-VI in FIG. 3. FIG. 5 is similar view to FIG. 4 except that the sealing valve assembly 40 is moved to its closed position. The sealing valve assembly 40 in the closed position is configured to block fluid f from flowing through the filter assembly 1.

As shown in FIG. 5, the sealing valve assembly 40 in its closed positon blocks the fluid from passing through the seal valve assembly 40 between filter housing 20 and the filter heat 90 (e.g., blocks fluid flow from the filter head 90 to the filter housing 20 and blocks fluid flow from the filter housing 20 to the filter head 90). The removable filter cartridge 10 is configured to have the seal valve assembly 40 actuated to the closed position while still removably coupled to the filter head 90. The sealing valve assembly 40 is closed by no longer supplying compressed gas to the sealing valves 70A, 70B (e.g., no longer applying compressed gas to the sealing valve 70A, 70B). The sealing valves 70A, 70B are moved to their closed position by decompressing the internal spaces 82A, 82B of the sealing valves 70A, 70B. For example, the internal space 82A of the inlet sealing valve 70A may be decompressed into the ambient environment by disconnecting the compressed gas line 92A from its external gas inlet 72A.

When the removable filter cartridge 10 is uncoupled from the filter head 90 (e.g., the coupled filter housing 20 and sealing valve assembly 40 are uncoupled/unscrewed from the filter head 90), the sealing valve assembly 40 is configured to maintain the sealing of the internal volume 22. For example, without the supply of compressed gas, the sealing valves 70A, 70B remain closed and seal the filter housing 20. The sealing valve assembly 40 is configured to maintain the sealing of the filter housing 20 while the filter cartridge 10 remains uncoupled from a filter head 90. In particular, the closing of the sealing valve assembly 40 seals the filter housing 20 such that any of the liquid in the internal volume 22 is trapped within the removable filter cartridge 10. This is advantageous over previous configuration in that the removable filter cartridge 10 can be removed more quickly without having to be drained of liquid.

Figure 6:
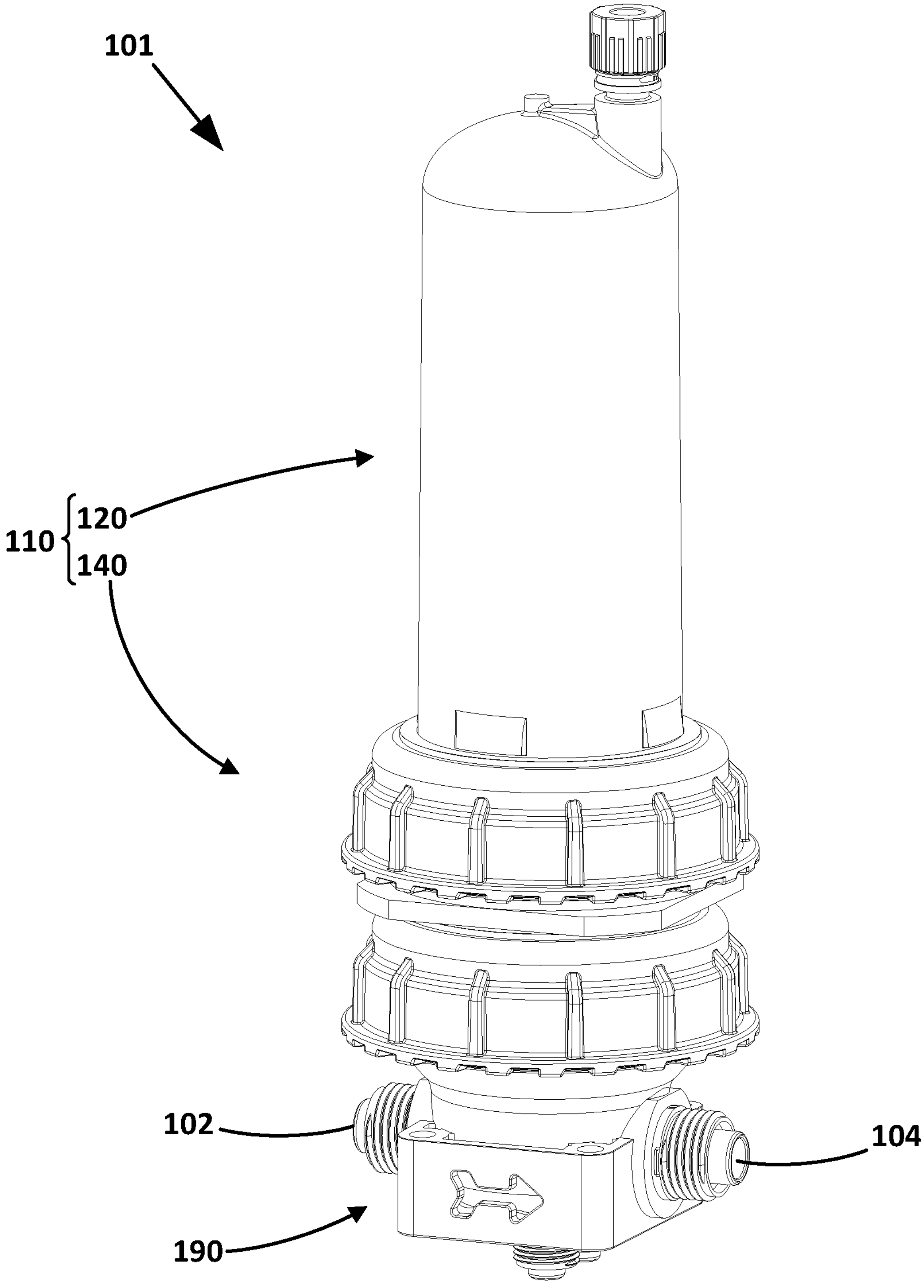
FIG. 6 is front perspective view of another embodiment of a filter assembly.
Figure 7:
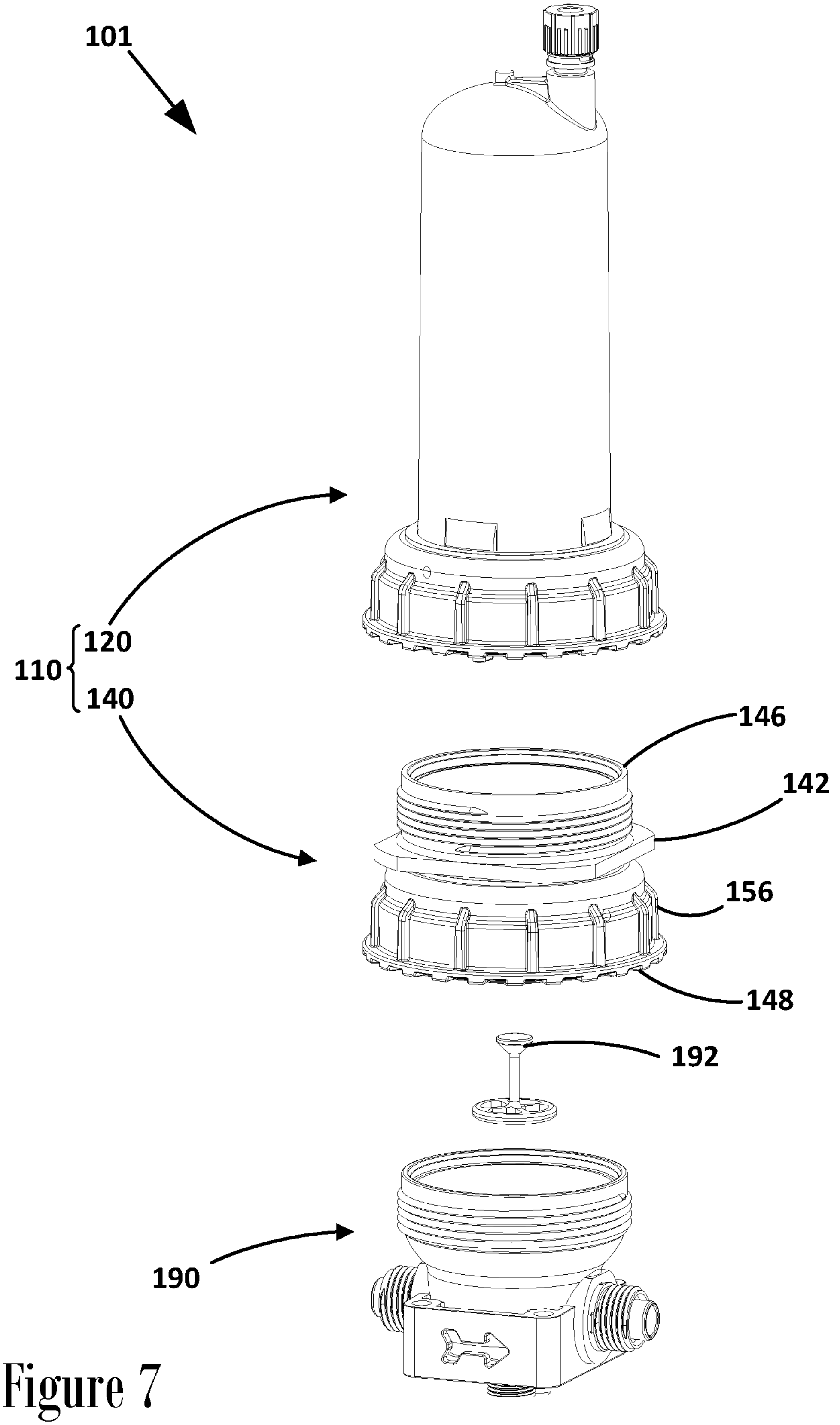
FIG. 7 is an exploded view of the removable filter cartridge in FIG. 6, according to an embodiment.

FIGS. 6 and 7 show another embodiment of a filter assembly 101. FIG. 6 is a side perspective view of the filter assembly 101. FIG. 7 is an exploded view of the filter assembly 101. The filter assembly 101 includes a removable filter cartridge 110 that is coupled to a filter head 190 and includes a filter housing 120 and a sealing valve assembly 140. The filter assembly 101 generally has a similar configuration to the filter assembly 1 in FIGS. 1-5 except for the sealing valve assembly 140. For example, the filter head 90 includes a fluid inlet 102 and a fluid outlet of the filter assembly 101 and is configured to supply the fluid through the removable filter cartridge 110; and the removable filter cartridge 110 filters the fluid passing that passes through similar to the removable filter cartridge 1 in FIG. 1. For example, the sealing valve assembly 140 has a first end 146 coupled to the filter housing 120 and a second end 148 removably coupled to the filter head 90. The filter assembly 101 can have features similar to the filter assembly 1 in FIGS. 1-5 unless described otherwise.

The filter housing 120 and the filter head 190 have a similar configuration to the filter head 90 and filter housing 20 of the filter assembly 1 in FIGS. 1-5. It should be appreciated that the filter housing 120 and/or the filter head 190 may be different in other embodiments as similarly described for the filter housing 20 and the filter head 90 in FIGS. 1-5. As shown in FIG. 7, the filter assembly 101 includes a push rod 192 for actuating the sealing valve assembly 140. The push rod 192 will be discusses in more detail below.

The sealing valve assembly 140 has an open position and a closed position. In the open position, the sealing valve assembly 140 is configured to allow fluid to flow through the sealing valve assembly 140. In the closed positon, the sealing valve assembly 140 is configured to block flow through the sealing valve assembly 140. The sealing valve assembly 140 has a first end 146 and a second end 148 opposite to the first end 146. For example, a valve body 142 of the sealing valve assembly 140 includes the first end 146 and the second end 148 of the sealing valve assembly 140.

The sealing valve assembly 140 is configured to be removably coupled to the filter head 190 as similarly discussed for the sealing valve 40 and filter head 90 in FIGS. 1-8. In the illustrated embodiment, the second end 148 of the sealing valve assembly 140 is removably coupled to the filter head 190 via a coupling nut 156 of the sealing valve assembly 140. The sealing valve assembly 140 can include the coupling nut 156 and a snap ring 160 (shown in FIG. 8) for coupling the sealing valve assembly 140 to the filter head 190. For example, the threads of the coupling nut 156 are screwed into threads on the filter head 190. In an embodiment, the sealing valve assembly 140 may be configured to removably couple to the filter head 190 by, for example but not limited to, a coupler (e.g., a tri-coupler, or the like).

Figure 8:
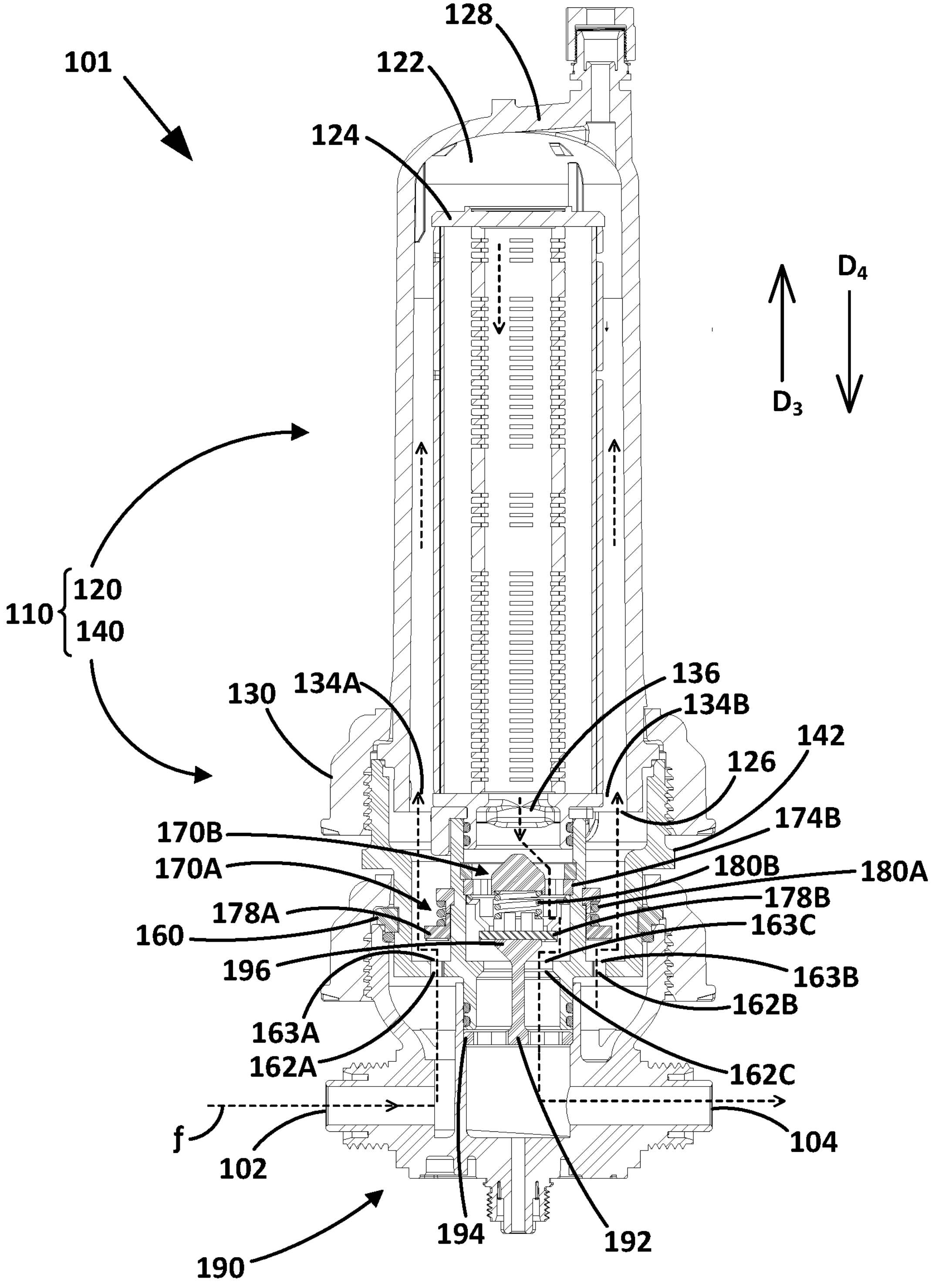
FIG. 8 is a vertical cross-sectional view of the filter assembly in FIG. 6 with a valve sealing assembly of the filter assembly in the open position, according to an embodiment.

As shown in FIG. 8, the filter housing 120 includes a first inlet 134A, a second inlet 134B, and an outlet 136 provided at the open end 126 of the filter housing 120 similar to the filter housing 120 in FIGS. 1-5. The filter housing 120 is configured such that the fluid f enters the filter housing 120 through the inlets 134A, 134B and exits the filter housing 120 (e.g., after passing through and being filtered by the filter 124) through the outlet 136. It should be appreciated that the filter housing 120 in an embodiment may have a different number of inlets and/or outlets than three as similarly discussed for the filter housing 20 in FIGS. 1-5.

The sealing valve assembly 140 includes passageways 162A, 162B, 162C that fluidly connect the filter housing 120 and the filter head 190 when open. As shown in FIG. 8, the sealing valve assembly 140 has the valve body 142 that includes the passageways 162A, 162B, 162C. The passageways 162A, 162B, 162C extend through the valve body 42. The fluid f flows through the sealing valve assembly 140 by flowing through the passageways 162A, 162B, 162C. The sealing valve assembly 140 includes a first inlet passageway 162A and a second inlet passageway 162B that directs fluid f from the filter head 190 into the filter housing 140 and an outlet passageway 162C that directs the fluid f (after being filtered in the filter housing 120) from the filter housing 120 back to the filer head 190. In an embodiment, the sealing valve assembly 140 may include a different number of inlet passageways 162A, 162B (e.g., one inlet passageway, etc.) and/or outlet passageways 162C (e.g., multiple outlet passageways, two outlet passageways, etc.)

The valve body 142 includes the passageways 162 for the inlets and outlet(s) 134A, 134B, 136 in the open end 126 of the filter housing 120. Each of the passageways 162 extends through the valve body 142. As shown in FIG. 8, the passageways 162 in the valve body 142 include the inlet passageways 162A, 162B and the outlet passageway 162C that separately extend through the valve body 142. In the illustrated embodiment, the inlet passageways 162 merge within the valve body 142 at the first end 146 such that the fluid f flowing through the inlet passageways 162A, 162B mixes and is supplied to both inlets 134A, 134B of the filter housing 120. In the open position, the inlet passageways 162A, 162B direct the fluid f from the filter head 190 (e.g., fluid to be filtered) to the inlets 134A, 136B of the filter housing 120 and the outlet passageway 162C directs the fluid f (e.g., the filtered fluid) from the outlet 136 of the filter housing 120 to the filter head 190. The inlet passageways 162A, 162B each connect the fluid inlet 102 of the filter head 190 (e.g., the passage in the filter head 90 extending from the fluid inlet 102) to the inlet(s) 134A, 134B of the filter housing 120. The outlet passage 162B connects the outlet 136 of the filter housing 120 (e.g., the passageway in the filter head 190 extending to the fluid outlet 104) to the fluid outlet 104 of the filter head 190.

As shown by the dashed lines in FIG. 8, the inlet passageways 162A, 162B fluidly connect the fluid inlet 102 of the filter head 190 to the first and second inlets 134A, 134B of the filter housing 120, and the outlet passageway 162B fluidly connects the outlet 136 of the filter housing 120 to the fluid outlet 104 of the filter head 190. For example, the inlet passageways 162A direct the fluid f supplied from the passage of the fluid inlet 102 of the filter head 190 to the inlets 134A, 134B of the filter housing 120. For example, the outlet passageway 162B directs the filtered fluid f from the outlet 136 to the passage in the filter head 190 for the fluid outlet 104.

The sealing valves include an inlet sealing valve 170A configured to block flow of liquid into the filter housing 120 (e.g., from the filter head 190) and an outlet sealing valve 170B configured to block flow of liquid out of the filter housing 120 (e.g., to the filter head 190). The sealing valve assembly 140 is configured to be actuated between the open position and the closed position by actuation of the sealing valves 170A, 170B from their open position to their closed position. In the illustrated embodiment, the inlet sealing valve 170A is a fluid check valve configured to be actuated between its open and closed positions by the pressure of the fluid f supplied from the filter head 190, and the outlet sealing valve 170B is a push valve configured to be actuated between its open and closed positions by the push rod 192 when the removable filter cartridge 120 (e.g., the sealing valve assembly 140) is removably coupled to the filter head 190.

The inlet sealing valve 170A is a fluid check valve that is configured to be actuated by the fluid f pushing on the inlet sealing valve 170A. When no fluid is pushing on the inlet sealing valve 170A (e.g., the filter head 190A is not supplying fluid to the sealing valve assembly 140, the removable filter cartridge 110 being uncoupled from the filter head 190A, etc.), the inlet sealing valve 170A is in its closed position. The default position of the inlet sealing valve 170A is its closed position. The inlet sealing valve 170A is configured to move from its closed position to its open position when the filter head 190 supplies a flow of fluid f to the sealing valve assembly 140.

In the illustrated embodiment, the inlet sealing valves 170A includes a backstop 174A, a valve head 178A, and a spring 180A disposed between the backstop 174A and the valve head 178A. In the illustrated embodiment, the valve head 178A has a planar torus shape that encircles the outlet passageway 162C. The backstop 174A is affixed to the valve body 142. In an embodiment, the backstop 174A may be formed as an integral part of the valve body 142. The valve head 178A is configured to be moveable relative to the valve body 142.

Figure 9:
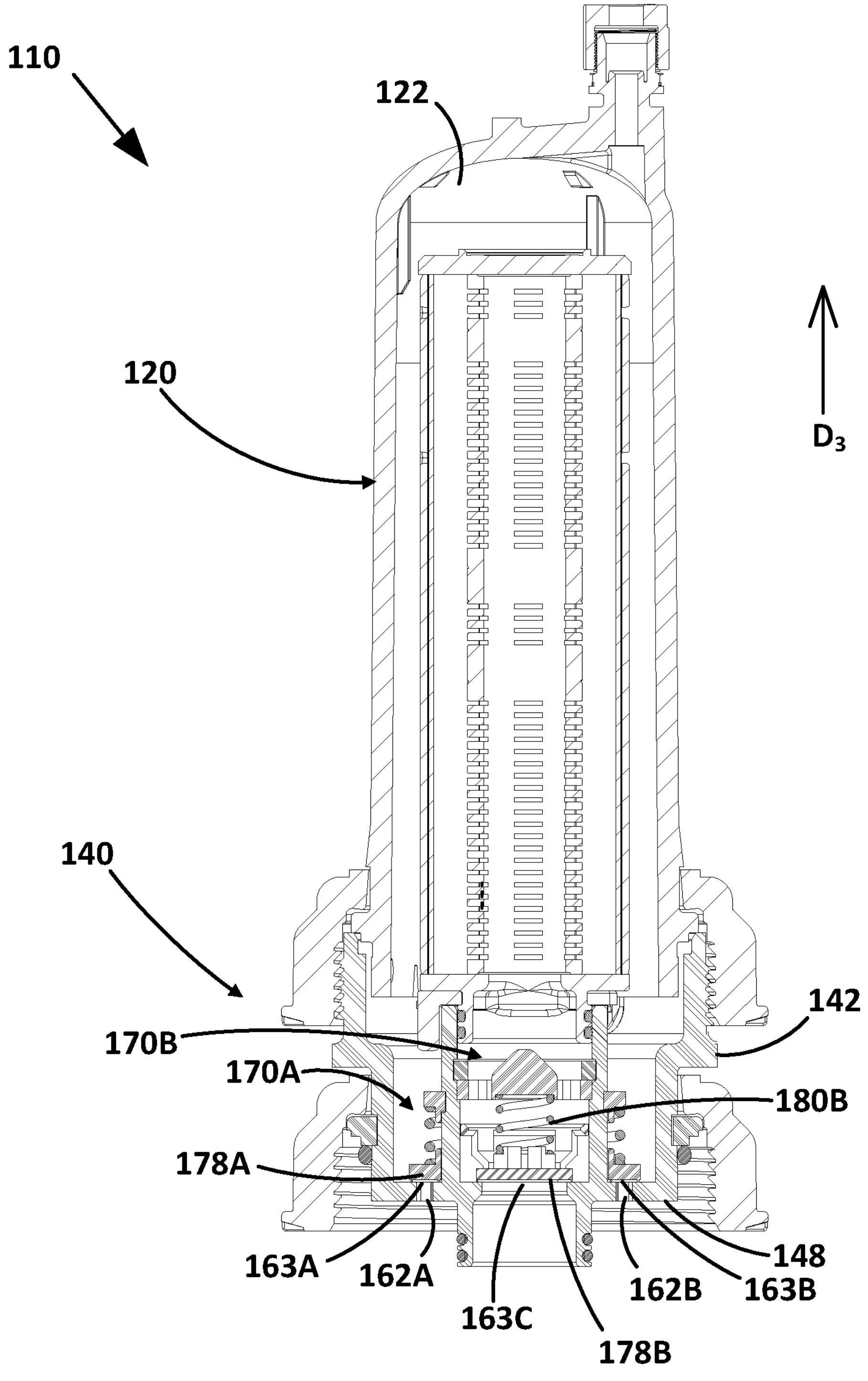
FIG. 9 is a vertical cross-sectional view of a removable filter cartridge of the filter assembly in FIG. 7 when uncoupled from a filter head, according to an embodiment.

The spring 180A is configured to bias the valve head 178A into its closed position (e.g., as shown in FIG. 9) that blocks the inlet passageways 162A. For example, the spring 180A biases/pushes the valve head 178A (e.g., in direction $D_3$) into its closed position that blocks the inlet passageways 162A, 162B (e.g., as show in FIG. 9). The pressure of the fluid f pushes the valve head 178A pushes the valve head 178A in the opposite direction (e.g., direction $D_4$) from its closed position into its open position as shown in FIG. 8. The pressure of the fluid f on the valve head 178A overcomes the biasing force of the spring 180A and compresses the spring 180A to move the valve head 178A into its open position.

The outlet sealing valve 170B is a push valve configured be actuated by a push rod 192 from its open position (shown in FIG. 8) to its closed position (shown in FIG. 9) when the removable filter cartridge 110 is removably coupled to the filter head 190. The removable coupling of the sealing valve assembly 140 to the filter head 190 moves the outlet sealing valve 170B from its closed position to its open position.

In the illustrated embodiment, the outlet sealing valve 170B includes a backstop 174B, a valve head 178B, and a spring 180B disposed between the backstop 174B and the valve head 178B. The backstop 174B is affixed to the valve body 142. In another embodiment, the backstop 174B may be formed as an integral part of the valve body 142. The valve head 178B is configured to be moveable relative to the valve body 142. In the illustrated embodiment, the valve head 178B has a continuous planar shape.

As shown in FIG. 8, in the assembled filter assembly 101, the push rod 192 is disposed between the sealing valve 40 and the filter head 190. More specifically, the push rod is disposed in the filter head 190 and extends into the valve body 142 of the sealing valve assembly 140. The push rod 192 include a first end 194 and a second end 196. The first end 194 of the push rod 192 is disposed in the filter head (e.g., the passageway in the filter head 190 extending to the fluid outlet 104) and the second end 196 of the push rod 192 is disposed in the outlet passageway 162C. The first end 194 of the push rod 192 directly contacts the filter head 190 and a second end 196 of the push rod 192 directly contacts the filter head 190. As shown FIG. 8, the filtered fluid f flowing from the outlet passage 162C to the outlet 104 of the filter head 190 flows through the first end 194 of the push rod 192 (e.g., flows through one or more through holes in the second end 194 of the push rod 192).

The spring 180B is configured to bias the valve head 178B into its closed position (e.g., as shown in FIG. 9) that blocks the outlet passageway 162C. For example, the spring 180B biases/pushes the valve head 178B (e.g., in direction $D_3$) into its closed position that blocks the outlet passageway 162C (e.g., as show in FIG. 9). When the sealing valve assembly 40 is removably coupled to the filter head 190, the push rod 192 is compressed between the valve head 178B and the filter head 190. As the push rod 192 is generally incompressible, the push 192 forces the valve head 178B upward from its closed position to its open position as shown in FIG. 8. As shown in FIG. 8, when the sealing valve assembly 40 is removably coupled to the filter head 190, the push rod 192 compresses the spring 180B. Through the push rod 192, the filter head 190 pushes on the valve head 178B and moves/actuates the valve head 178B into its open position. The pressure/force of the push rod 192 on the valve head 178B pushes the closed valve head 178B in the opposite direction (e.g., direction $D_4$ that is away from the filter head 190) into its open position as shown in FIG. 8. The upward force on the valve head 178B overcomes the biasing force of the spring 180B and compresses the spring 180B to move the valve head 178B into its open position.

As discussed above, the filter cartridge 110 (e.g., the sealing valve assembly 140) is removably coupled to the filter head 190. FIG. 9 is a vertical cross-sectional view of the filter cartridge 140 when uncoupled from the filter head 190. The cross-section in FIG. 9 is along the same plane as FIG. 8.

FIG. 9 shows the sealing valve assembly 140 when closed. The sealing valve assembly 140 actuates from open (as shown in FIG. 8) to closed (as shown in FIG. 9) during the uncoupling of the filter cartridge 110 (e.g. the sealing valve assembly 140) from the filter head 190. The actuating of the sealing valve assembly 140 from open to closed includes actuating the inlet sealing valve 170A from its open position to its closed position and actuating the outlet sealing valve 170B from its open position to its closed position. The inlet sealing valve 170A closes when fluid f is no longer being supplied into the sealing valve assembly 170A from the filter head 190. When uncoupled from the filter head 110, the filter head 190 is no longer fluidly connected to the filter cartridge 110 such that fluid is no longer being supplied to the filter cartridge 100. Generally, the flow of fluid f to the filter cartridge 110 is configured to stop prior to the uncoupling of the filter cartridge 110 from the filter head 190. In such a configuration, the inlet sealing valve 170A may actuate to its closed position prior to the actual action of uncoupling the filter cartridge 110 from the filter head 190.

The actuation of the outlet sealing valve 170B from its open position to its closed position occurs during the uncoupling of the filter cartridge 110 (e.g., the sealing valve assembly 140) from the filter head 110. During the uncoupling of the filter cartridge 110, the second end 148 of the sealing valve assembly 140 is moved away from the filter head 110 (e.g., in direction $D_4$). As the distance between the second end 146 of the sealing valve assembly 140 and the filter head 190 increases, the push rod 192 no longer leverages/pushes the valve head 178B upwards (e.g., in direction $D_3$) and the spring 180B pushes the valve head 178B back into its closed position. In an embodiment, the push rod 192 has a length that results in the valve head 178B being moved to its closed position (as shown in FIG. 9) during the uncoupling before the sealing valve 140 becomes completely uncoupled (e.g., the valve head 178B moved into its closed position while the sealing valve 140 is still partially screwed onto the filter head 190).

FIG. 9 shows the inlet sealing valve 170A and its valve head 178A in its closed position. The valve head 178A of the inlet sealing valve 170A in its closed position blocks the inlet passageways 162A, 162B by extending over and blocking the openings 163A, 163B in the valve body 162A for the inlet passageways 162A, 162B. In its closed position, the valve head 178 is pressed against the valve body 142 (e.g., an inner surface of the valve body 142) and seals the openings 163A, 163A in the valve body 142 for the inlet passageways 162A, 162B.

FIG. 9 shows the outlet sealing valve 170B and its valve head 178A in its closed position. The valve head 178B of the outlet sealing valve 170B in its closed position blocks the outlet passageway 162C by extending over and blocking an opening 162C in the valve body 142 for the outlet passageway 162C. In its closed position, the valve head 178B is pressed against the valve body 142 (e.g., an inner surface of the valve body 142) and seals the opening 163C in the valve body 142 for the outlet passageway 162C. For example, the outer circumference of the valve head 178 is in direct contact with the valve body 142 in the closed position.

In the illustrated embodiment, the push rod 192 is shown as a separate piece from the sealing valve 140 and the filter head 190. In an embodiment, the filter head 190 may include the push rod 192 as a separate piece as shown in FIGS. 7 and 8. In an embodiment, the push rod 192 may be an integral piece of the filter head 190 (e.g., the filter head 190 formed to include the push rod 192, the end 194 of the push rod 192 affixed to the filter head 190, etc.). In another embodiment, the push rod 192 may be provided with the sealing valve assembly 140. For example, the push rod 192 may be provided as a separate piece of the sealing valve assembly 140 or as an integral piece of the outlet sealing valve 170B (e.g., the valve head 178B formed to include the push rod 192, the end 196 of the push rod 192 affixed to the valve head 178B).

When the removable filter cartridge 110 is uncoupled from the filter head 190 (e.g., the coupled filter housing 120 and sealing valve assembly 140 are uncoupled/unscrewed from the filter head 90), the sealing valve assembly 140 is configured to maintain the sealing of the internal volume 122. The sealing valve assembly 140 is configured to maintain the sealing of filter housing 120 while the cartridge remains uncoupled from a filter head. In particular, the closing of the sealing valve assembly 140 seals the filter housing 120 such that any of the liquid in the internal volume 122 is trapped within the removable filter cartridge 110. This is advantageous over previous configuration in that the removable filter cartridge 110 can be removed more quickly without having to be drained of liquid.

It should be appreciated that an embodiment of a sealing valve assembly may include an inlet check valve and an outlet check valve that are selected from different combinations then disclosed in FIGS. 1-9. In an embodiment, a sealing valve assembly may include an inlet sealing valve that is one of a gas open valve (e.g., inlet sealing valve 70A), a fluid check valve (e.g., inlet check valve 170A), and a push valve; and an outlet sealing valve that is one of a gas open valve (e.g. outlet sealing valve 70B), a fluid check valve, and a push valve (e.g., outlet check valve 170B). For example, a sealing valve assembly in an embodiment may include an inlet sealing valve that is a gas open valve (e.g., inlet sealing valve 70A) and an outlet check valve that is a push valve (e.g., outlet check valve 170B). For example, a sealing valve assembly in an embodiment may include an inlet sealing valve that is a fluid check valve (e.g., inlet check valve 170A) and an outlet sealing valve that is a gas open valve (e.g., outlet sealing valve 170B).

Figure 10:
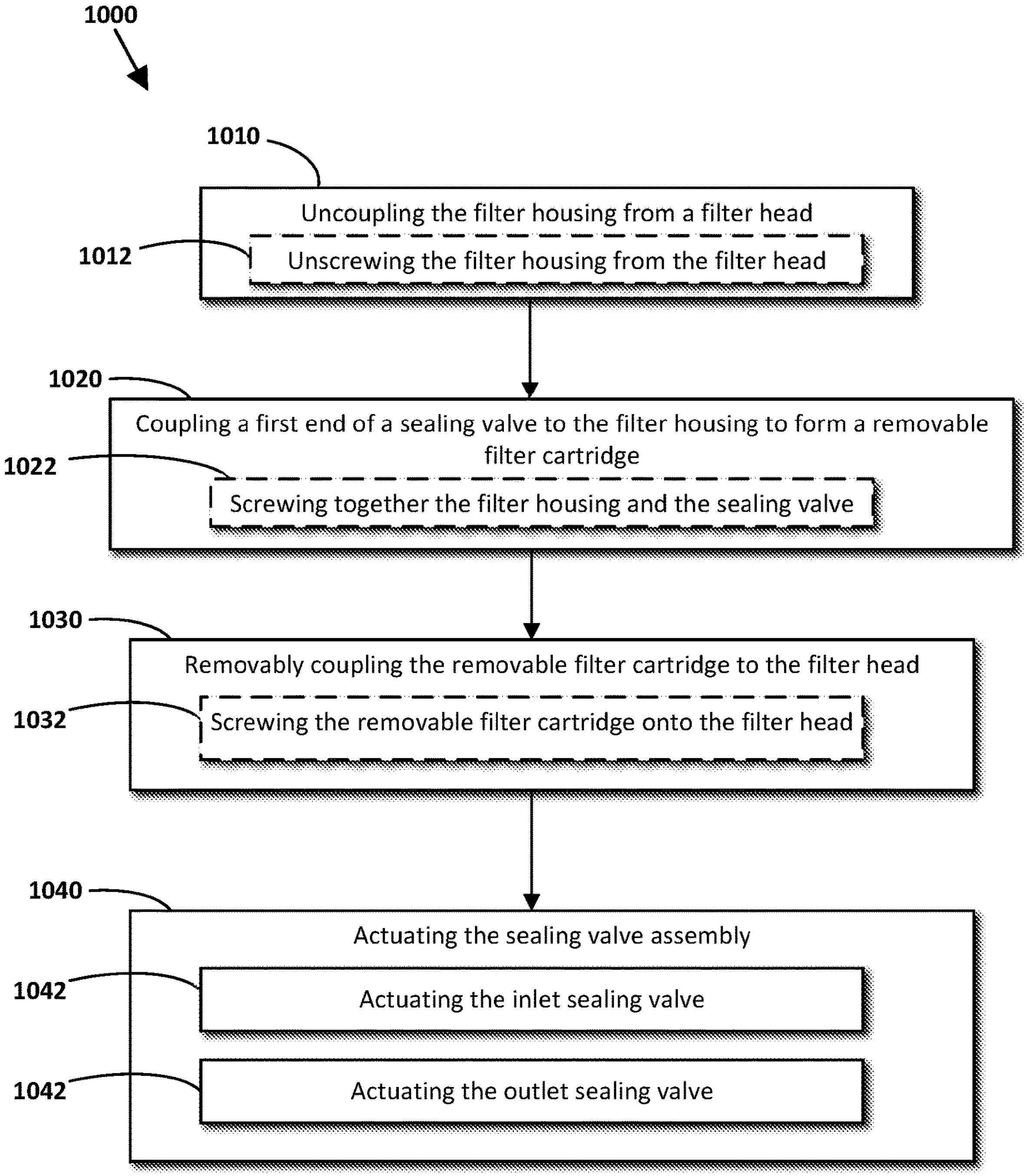
FIG. 10 is a block flow diagram of an embodiment of a method of retrofitting a filter housing.

FIG. 10 shows a block flow diagram of a method 1000 of retrofitting a filter housing (e.g., filter housing 20, filter housing 120). The filter housing has an internal volume (e.g., internal volume 22, internal volume 122) containing a filter (e.g., filter 24, filter 124). For example, the method 1000 may be for retrofitting a filter housing (e.g., filter housing 120) that was originally intended to be directly removably coupled to a filter head (e.g., filter header 90, filter head 190). The method starts at 1010.

At 1010, the filter housing is uncoupled from the filter head. Removing the filter housing from the filter head 1010 includes uncoupling an open end of the filter housing (e.g., open end 26, open end 126) from the filter head. In an embodiment, uncoupling the filter housing from the filter head 1010 may include unscrewing the filter housing form the filter head 1012. For example, unscrewing the filter housing from the filter head can include unscrewing a coupling nut of the filter housing (e.g., coupling nut 30, coupling nut 130) from the filter head. The method 1000 then proceeds to 1020.

At 1020, a first end (e.g., first end 46, first end 146) of a sealing valve (e.g., sealing valve assembly 40, sealing valve assembly 140) is coupled to the removable filter to form a removable filter cartridge (e.g., removable filter cartridge 10, removable filter cartridge 110). In an embodiment, coupling the sealing valve to the removable filter 1020 includes screwing together the filter housing and the sealing valve 1022. For example, screwing together the filter housing and the sealing valve 1022 can include screwing the coupling nut of the filter housing onto the sealing valve. The method 1000 then proceeds to 1030.

At 1030, the removable filter cartridge is removably coupled to the filter head. Removably coupling the cartridge to the filter head 1030 includes removably coupling a second end of the sealing valve (e.g., second end 48, second end 148) to the filter head. In an embodiment, removably coupling the removable filter cartridge to the filter head at 1030 may include screwing the removable filter cartridge onto the filter head 1032. For example, screwing the removable filter cartridge onto the filter head at 1032 may include screwing a coupling nut of the sealing valve (e.g., coupling nut 56, coupling nut 156) onto the filter head. The method 1000 then proceeds to 1040.

At 1040, the sealing valve assembly is actuated from closed (e.g., sealing valve assembly 40 in FIG. 5, sealing valve assembly in FIG. 9) to open (e.g., sealing valve assembly 40 in FIG. 4, sealing valve assembly in FIG. 8). The actuation of the sealing valve assembly at 1040 can include actuating an inlet sealing valve of the sealing valve assembly 1042 (e.g., inlet sealing valve 70A, inlet sealing valve 170A) and actuating an outlet sealing valve of the sealing valve assembly 1042 (e.g., outlet sealing valve 70B, outlet sealing valve 170B).

In an embodiment, the inlet check valve can be a gas open valve (e.g., inlet check valve 70A) and actuating the inlet sealing valve at 1042 can include supplying compressed gas to an external gas inlet of the inlet sealing valve (e.g., external gas inlet 72A) to actuate the inlet check valve from a closed position to an open position. In an embodiment, the inlet check valve can be a fluid check valve (e.g. inlet check valve 170A) and actuating the inlet sealing valve at 1042 can include the filter head supplying liquid (e.g., fluid f in FIG. 8) from the filter head to the inlet passageway of the sealing valve and the pressure of the liquid in the inlet passageway on the inlet sealing valve actuates the inlet sealing valve from the closed position to the open position. In an embodiment, the outlet check valve can be a gas open valve (e.g., outlet check valve 70B) and actuating the outlet sealing valve at 1044 can include supplying compressed gas to an external gas inlet of the outlet sealing valve to actuate the outlet check valve from a closed position to an open position. In an embodiment, the outlet check valve can be a push valve and actuating the outlet sealing valve at 1044 can include the filter head pushing, via a push rod (e.g., push rod 192), a filter head of the outlet check valve (e.g., filter head 178B) from a closed position to an open position. In such an embodiment, the actuating of the outlet sealing valve at 1044 can occur during the removably coupling of the sealing valve to the filter head (e.g., removable coupling of the filter cartridge to the filter head at 1030 including the actuating of the outlet sealing valve 1044).

It should be appreciated that the method 1000 in an embodiment may be modified to include features as described above with respect to the filter assembly 1 in FIGS. 1-5 and/or the filter assembly 101 in FIGS. 6-9.

Aspects:

Any of Aspects 1-11 can be combined with any of Aspects 12-19, and any of Aspects 12-15 can be combined with any of Aspects 16-19.

Aspect 1. A removable filter cartridge, comprising: a filter housing with an internal volume containing a filter, the filter configured to filter liquid passing through the internal volume, the filter housing including an open end with an inlet and an outlet; and a sealing valve assembly including: a first end configured to removably couple the sealing valve assembly to a filter head, a second end coupled to the open end of the filter housing, an inlet passageway configured to direct liquid into the inlet of the filter housing, an outlet passageway configured to direct the liquid discharged from the outlet of the filter housing after being filtered by the filter, and an inlet sealing valve configured to block the inlet passageway and an outlet sealing valve configured to block the outlet passageway when the sealing valve assembly is uncoupled from the filter head such that the internal volume is sealed while the removable filter cartridge is uncoupled from the filter head.

Aspect 2. The removable filter cartridge of Aspect 1, wherein the inlet sealing valve is one of a gas open valve, a fluid check valve, and a push valve, and the outlet sealing valve is one of a gas open valve, a fluid check valve, and a push valve.

Aspect 3. The removable filter cartridge of any one of Aspects 1 and 2, wherein the inlet sealing valve is a gas open valve, the inlet sealing valve including a valve head, a spring biasing the valve head into a closed position that blocks the inlet passageway, and an external gas inlet for supplying compressed gas into the inlet sealing valve.

Aspect 4. The removable filter cartridge of Aspect 3, wherein the inlet sealing valve is configured to be actuated from the closed position to an open position by the compressed gas supplied through the external gas inlet.

Aspect 5. The removable filter cartridge of any one of Aspects 3 and 4, wherein the inlet sealing valve includes an internal space fluidly connected to the external gas inlet, the external gas inlet configured to direct the compressed gas into the internal space to compress the spring and actuate the valve head into an open position.

Aspect 6. The removable filter cartridge of any one of Aspects 3-5, wherein the sealing valve assembly includes a valve body, the valve body including the inlet passageway and the outlet passageway, and the inlet sealing valve and the outlet sealing valve each being coupled to the valve body.

Aspect 7. The removable filter cartridge of any one of Aspects 1-6, wherein the outlet sealing valve is a gas open valve, the outlet sealing valve includes an external gas inlet, and the outlet sealing valve configured to be actuated from a closed position to an open position by compressed gas supplied to the filter cartridge through the second external gas inlet.

Aspect 8. The removable filter cartridge of any one of Aspects 1-6, wherein the outlet sealing valve is a push valve configured to actuate from a closed position that blocks the outlet passageway to an open position by the removable coupling of the sealing valve assembly to the filter head.

Aspect 9. The removable filter cartridge of Aspect 8, wherein the outlet sealing valve is configured to be actuated from the closed position to the open position by a push rod disposed between the sealing valve and the filter head when the sealing valve is removable coupled to the filter head.

Aspect 10. The removable filter cartridge of Aspect 9, wherein the outlet sealing valve includes a valve head and a spring biasing the valve head into the closed position that blocks the outlet passageway, the push rod configured to push the valve head into the open position during the removable coupling of the removable filter cartridge to the filter head.

Aspect 11. The removable filter cartridge of any one of Aspects 7-10, wherein the inlet sealing valve is a fluid check valve configured to be actuated from a closed position that blocks the inlet flow passage to an open position by the filter head supplying the liquid to the inlet passageway.

Aspect 12. A sealing valve assembly for a removable filter cartridge, the sealing valve comprising: a first end configured to removably couple the sealing valve assembly to a filter head; an inlet passageway and an outlet passageway that each extend through the sealing valve assembly; a second end configured to couple the sealing valve assembly to a filter housing to form the removable filter cartridge such that the inlet passageway directs liquid into an inlet of the filter housing and the outlet passageway directs the liquid discharged from an outlet of the filter housing after passing through the filter housing, the filter housing including an internal volume and a filter configured to filter the liquid passing through the filter housing; and an inlet sealing valve configured to block the inlet passageway and an outlet sealing valve configured to block the outlet passageway when the sealing valve assembly is uncoupled from the filter head such that the internal volume is sealed while the removable filter cartridge is uncoupled from the filter head.

Aspect 13. The sealing valve assembly of Aspect 12, wherein the inlet sealing valve is a gas open valve, the inlet sealing valve including an external gas inlet for supplying compressed gas into the inlet sealing valve to actuate the inlet sealing valve from a closed position that blocks the inlet passageway to an open position.

Aspect 14. The sealing valve assembly of any one of Aspects 12 and 13, wherein the outlet sealing valve is a gas open valve, the outlet sealing valve including a second external gas inlet for supplying compressed gas into the outlet sealing valve to actuate the outlet sealing valve from a closed position that blocks the outlet passageway to an open position.

Aspect 15. The sealing valve assembly of any one of Aspects 12 and 13, wherein the outlet sealing valve is a push valve configured to be actuated by a push rod from a closed position that blocks the outlet passageway to an open position by the removable coupling of the sealing valve assembly to the filter head.

Aspect 16. A method of retrofitting a filter housing, the filter housing having an internal volume containing a filter configured to filter liquid, the method comprising: removing the filter housing from a filter head, which includes uncoupling the filter housing from the filter head; coupling a sealing valve assembly to the filter housing to form a removable filter cartridge, which includes coupling a first end of the sealing valve assembly to an open end of the filter housing; coupling the removable filter cartridge to the filter head, which includes coupling a second end of the sealing valve assembly to the filter head, wherein the sealing valve assembly includes: an inlet passageway that directs liquid from the filter head into an inlet of the filter housing, an outlet passageway that directs the liquid discharged from an outlet of the filter housing after passing through the filter to the filter head, and an inlet sealing valve configured to block the inlet passageway and an outlet sealing valve configured to block the outlet passageway when the sealing valve assembly is uncoupled from the filter head such that the internal volume is sealed while the removable filter cartridge is uncoupled from the filter head.

Aspect 17. The method of Aspect 16, further comprising: supplying compressed gas to an external gas inlet of the inlet sealing valve to actuate the inlet sealing valve from a closed position that blocks the inlet passageway to an open position that allows the liquid to pass through the inlet passageway, the inlet sealing valve being a gas open valve.

Aspect 18. The method of any one of Aspects 16 and 17, wherein the coupling of the removable filter cartridge to the filter head includes the filter head pushing, via a push rod, a valve head of the outlet sealing valve from a closed position that blocks the outlet passageway into an open position that allows the liquid to pass through the outlet passageway.

Aspect 19. The method of any one of Aspects 16 and 18, further comprising: supplying the liquid from the filter head to the inlet passageway of the sealing valve, a pressure of the liquid in the inlet passageway on the inlet sealing valve actuating the inlet sealing valve from a closed position that blocks the inlet passageway to an open position.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A removable filter cartridge, comprising:

a filter housing with an internal volume containing a filter, the filter configured to filter liquid passing through the internal volume, the filter housing including an open end with an inlet and an outlet; and a sealing valve assembly including:

a first end configured to removably couple the sealing valve assembly to a filter head, a second end coupled to the open end of the filter housing, an inlet passageway configured to direct liquid into the inlet of the filter housing, an outlet passageway configured to direct the liquid discharged from the outlet of the filter housing after being filtered by the filter, and an inlet sealing valve configured to block the inlet passageway and an outlet sealing valve configured to block the outlet passageway when the sealing valve assembly is uncoupled from the filter head such that the internal volume is sealed while the removable filter cartridge is uncoupled from the filter head, wherein the inlet sealing valve is a gas open valve, and the outlet sealing valve is a gas open valve, wherein both the inlet sealing valve and the outlet sealing are configured to be actuated from a closed position to an open position when supplied compressed gas.

2. The removable filter cartridge of claim 1, wherein the inlet sealing valve includes a valve head, a spring biasing the valve head into a closed position that blocks the inlet passageway, and an external gas inlet for supplying the compressed gas into the inlet sealing valve.

3. The removable filter cartridge of claim 2, wherein the inlet sealing valve is configured to be actuated from the closed position to the open position by the compressed gas supplied through the external gas inlet.

4. The removable filter cartridge of claim 2, wherein the inlet sealing valve includes an internal space fluidly connected to the external gas inlet, the external gas inlet configured to direct the compressed gas into the internal space to compress the spring and actuate the valve head into an open position.

5. The removable filter cartridge of claim 2, wherein the sealing valve assembly includes a valve body, the valve body including the inlet passageway and the outlet passageway, and the inlet sealing valve and the outlet sealing valve each being coupled to the valve body.

6. The removable filter cartridge of claim 2, wherein the outlet sealing valve includes a second external gas inlet, and the outlet sealing valve configured to be actuated from the closed position to the open position by the compressed gas supplied to the filter cartridge through the second external gas inlet.

7. A sealing valve assembly for a removable filter cartridge, the sealing valve assembly comprising:

a first end configured to removably couple the sealing valve assembly to a filter head;

an inlet passageway and an outlet passageway that each extend through the sealing valve assembly;

a second end configured to couple the sealing valve assembly to a filter housing to form the removable filter cartridge such that the inlet passageway directs liquid into an inlet of the filter housing and the outlet passageway directs the liquid discharged from an outlet of the filter housing after passing through the filter housing, the filter housing including an internal volume and a filter configured to filter the liquid passing through the filter housing; and an inlet sealing valve configured to block the inlet passageway and an outlet sealing valve configured to block the outlet passageway when the sealing valve assembly is uncoupled from the filter head such that the internal volume is sealed while the removable filter cartridge is uncoupled from the filter head, wherein the inlet sealing valve is a gas open valve, and the outlet sealing valve is a gas open valve, wherein both the inlet sealing valve and the outlet sealing are configured to be actuated from a closed position to an open position when supplied compressed gas.

8. The sealing valve assembly of claim 7, wherein the inlet sealing valve includes an external gas inlet for supplying the compressed gas into the inlet sealing valve to actuate the inlet sealing valve from the closed position that blocks the inlet passageway to the open position.

9. The sealing valve assembly of claim 7, wherein the outlet sealing valve includes a second external gas inlet for supplying the compressed gas into the outlet sealing valve to actuate the outlet sealing valve from the closed position that blocks the outlet passageway to the open position.

10. A method of retrofitting a filter housing, the filter housing having an internal volume containing a filter configured to filter liquid, the method comprising:

removing the filter housing from a filter head, which includes uncoupling the filter housing from the filter head;

coupling a sealing valve assembly to the filter housing to form a removable filter cartridge, which includes coupling a first end of the sealing valve assembly to an open end of the filter housing;

coupling the removable filter cartridge to the filter head, which includes coupling a second end of the sealing valve assembly to the filter head, wherein the sealing valve assembly includes:

an inlet passageway that directs liquid from the filter head into an inlet of the filter housing, an outlet passageway that directs the liquid discharged from an outlet of the filter housing after passing through the filter to the filter head, and an inlet sealing valve configured to block the inlet passageway and an outlet sealing valve configured to block the outlet passageway when the sealing valve assembly is uncoupled from the filter head such that the internal volume is sealed while the removable filter cartridge is uncoupled from the filter head;

supplying compressed gas to an external gas inlet of the inlet sealing valve to actuate the inlet sealing valve from a closed position that blocks the inlet passageway to an open position that allows the liquid to pass through the inlet passageway, the inlet sealing valve being a gas open valve.

* * * * *